US012269273B2

(12) United States Patent
Lee et al.

(10) Patent No.: US 12,269,273 B2
(45) Date of Patent: Apr. 8, 2025

(54) SUBSTRATE TREATING LIQUID SUPPLY UNIT AND SUBSTRATE TREATING APPARATUS INCLUDING THE SAME

(71) Applicant: SEMES CO., LTD., Chungcheongnam-do (KR)

(72) Inventors: Dong Hwa Lee, Chungcheongnam-do (KR); Dai Geon Yoon, Chungcheongnam-do (KR); Soo Hong Lee, Gyeonggi-do (KR); Ji Hyeon Kim, Chungcheongnam-do (KR); Dae Sung Kim, Chungcheongnam-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 105 days.

(21) Appl. No.: 17/851,029

(22) Filed: Jun. 28, 2022

(65) Prior Publication Data

US 2023/0031300 A1 Feb. 2, 2023

(30) Foreign Application Priority Data

Jul. 28, 2021 (KR) ........................ 10-2021-0099084

(51) Int. Cl.
*B41J 2/175* (2006.01)

(52) U.S. Cl.
CPC ....... *B41J 2/17556* (2013.01); *B41J 2/17566* (2013.01)

(58) Field of Classification Search
CPC .... B41J 2/17556; B41J 2/17566; B41J 2/175; B41J 2/0451; B41J 2/17513; B41J 2002/17579; G02F 1/1303; H01L 21/6715
(Continued)

(56) References Cited

U.S. PATENT DOCUMENTS

2007/0052764 A1* 3/2007 Oku ......................... B41J 2/161 347/68
2016/0059578 A1* 3/2016 Ishikawa .............. B41J 2/17596 347/85
(Continued)

FOREIGN PATENT DOCUMENTS

KR 10-2009-0124757 12/2009
KR 10-1397307 5/2014
(Continued)

OTHER PUBLICATIONS

Office Action dated Sep. 25, 2023 for Korean Patent Application No. 10-2021-0099084 and its English translation from Global Dossier.
(Continued)

*Primary Examiner* — Jason S Uhlenhake
*Assistant Examiner* — Alexander D Shenderov
(74) *Attorney, Agent, or Firm* — WOMBLE BOND DICKINSON (US) LLP

(57) ABSTRACT

Provided are a substrate treating liquid supply unit for constantly maintaining a liquid level of a nozzle of an inkjet head unit through real-time water level measurement, and a substrate treating apparatus including the same. The substrate treating liquid supply unit includes: a first reservoir connected to an inkjet head unit for jetting a substrate treating liquid onto a substrate and providing the substrate treating liquid to the inkjet head unit; a water level sensor measuring a water level of the substrate treating liquid stored in the first reservoir; and a pressure control module compensating for a pressure provided to the first reservoir based on an amount variation in the water level of the substrate treating liquid, wherein a liquid level of a nozzle of the inkjet head unit is constantly maintained.

18 Claims, 5 Drawing Sheets

(58) Field of Classification Search
USPC .............................................................. 347/85
See application file for complete search history.

(56) References Cited

U.S. PATENT DOCUMENTS

| | | | | |
|---|---|---|---|---|
| 2019/0193396 | A1* | 6/2019 | Ohtsu | B41J 2/17596 |
| 2019/0248132 | A1* | 8/2019 | Gu | B41J 2/04 |

FOREIGN PATENT DOCUMENTS

| | | |
|---|---|---|
| KR | 10-2015-0136217 | 12/2015 |
| KR | 10-2018-0046118 | 5/2018 |
| KR | 10-2142211 | 8/2020 |
| KR | 10-2194622 | 12/2020 |
| KR | 10-2232668 | 3/2021 |

OTHER PUBLICATIONS

Office Action dated Jan. 22, 2025 for Chinese Patent Application No. 202210754239.2 and its English translation by Google Translate.

* cited by examiner

[FIG. 1]
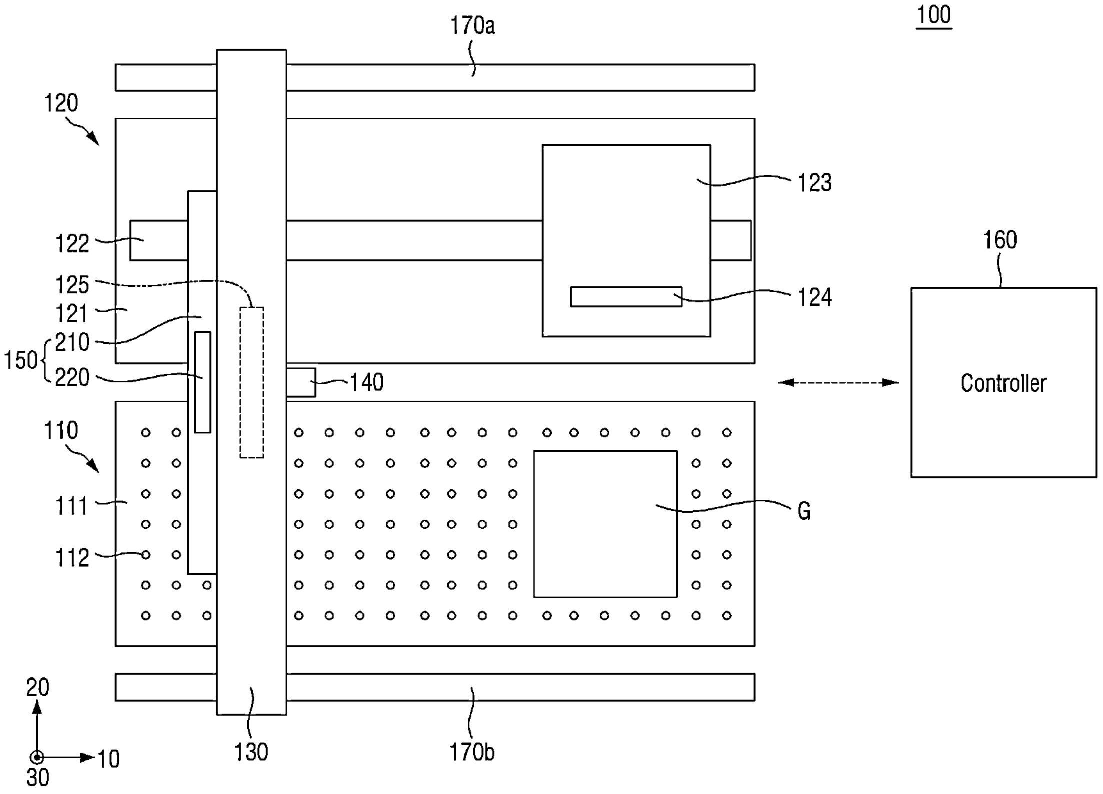

[FIG. 2]
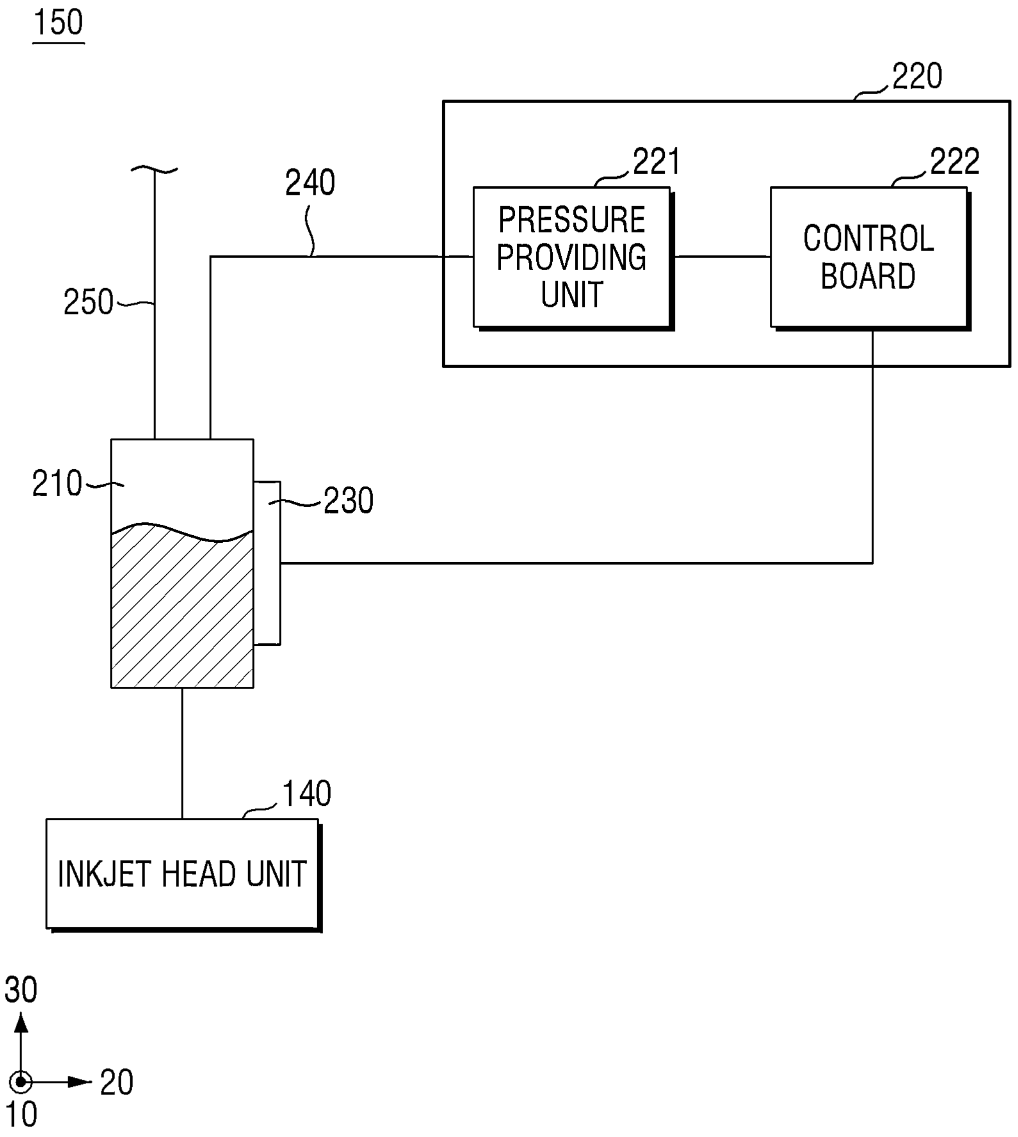

[FIG. 3]
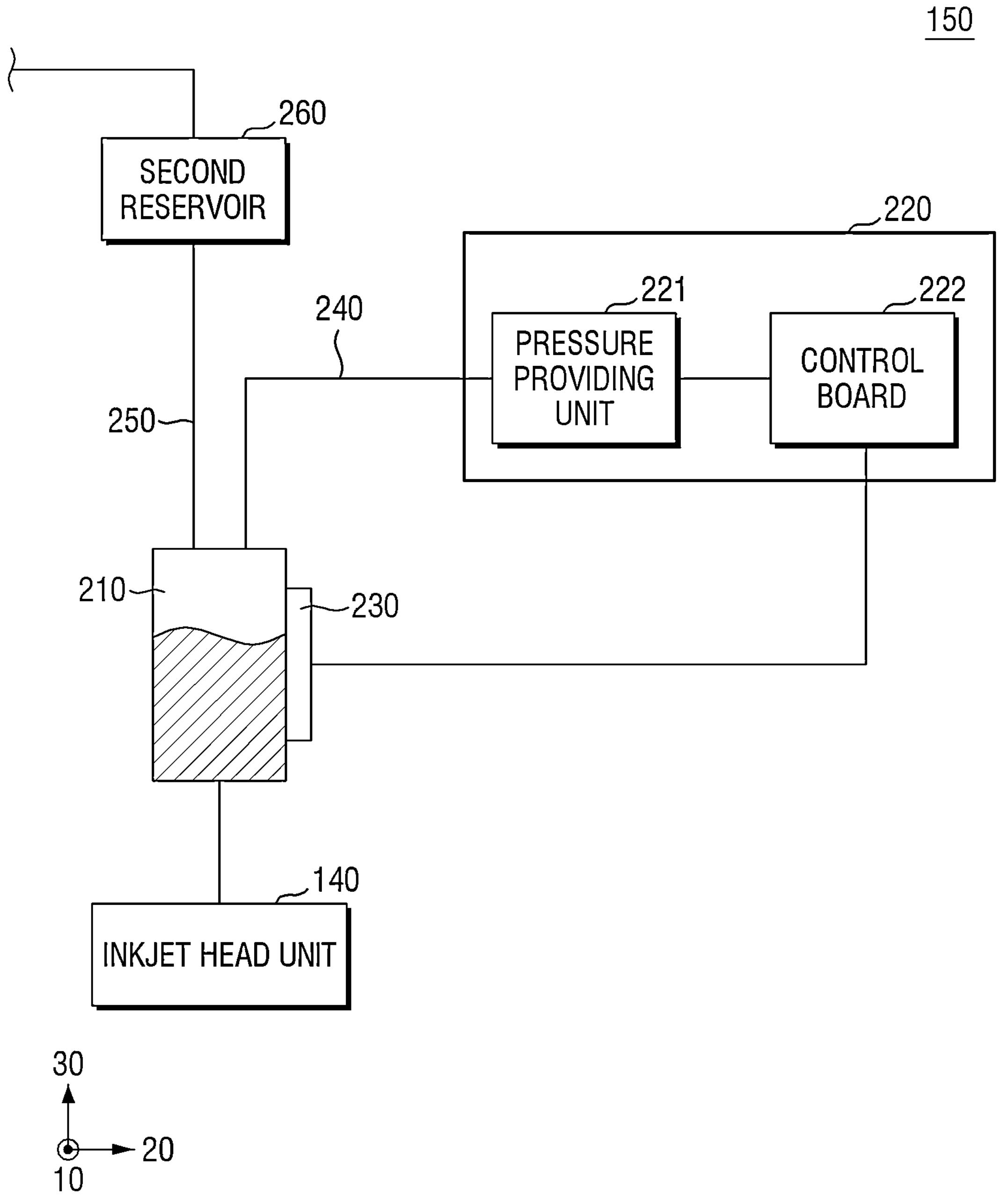

[FIG. 4]
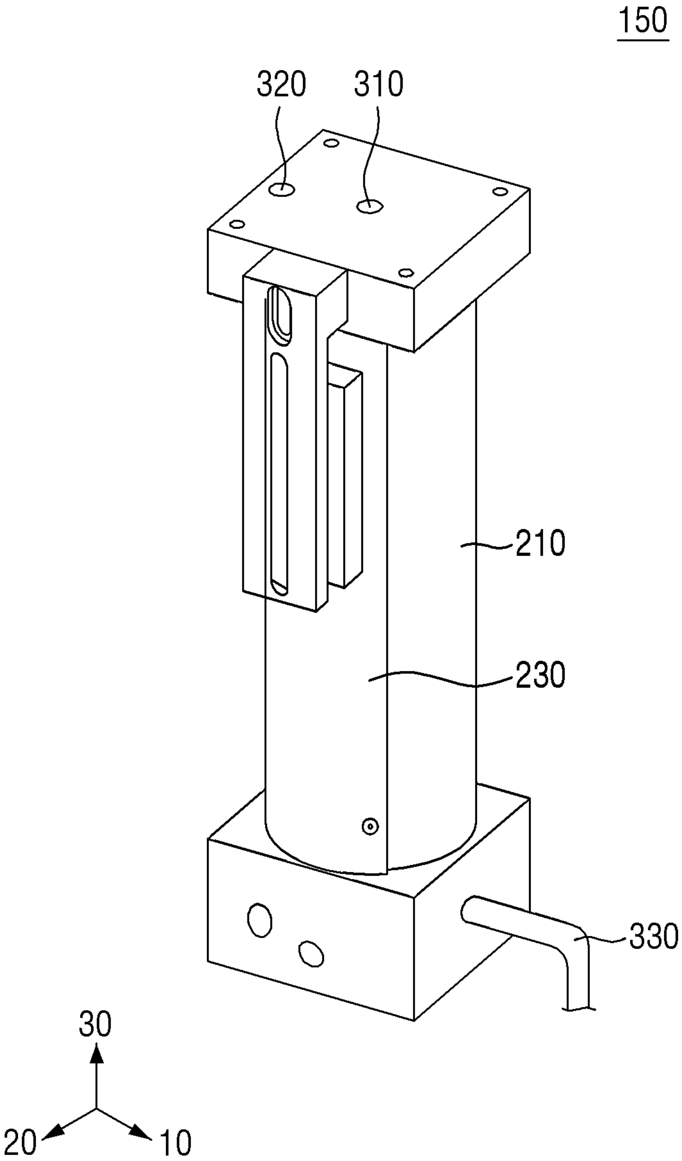

[FIG. 5]
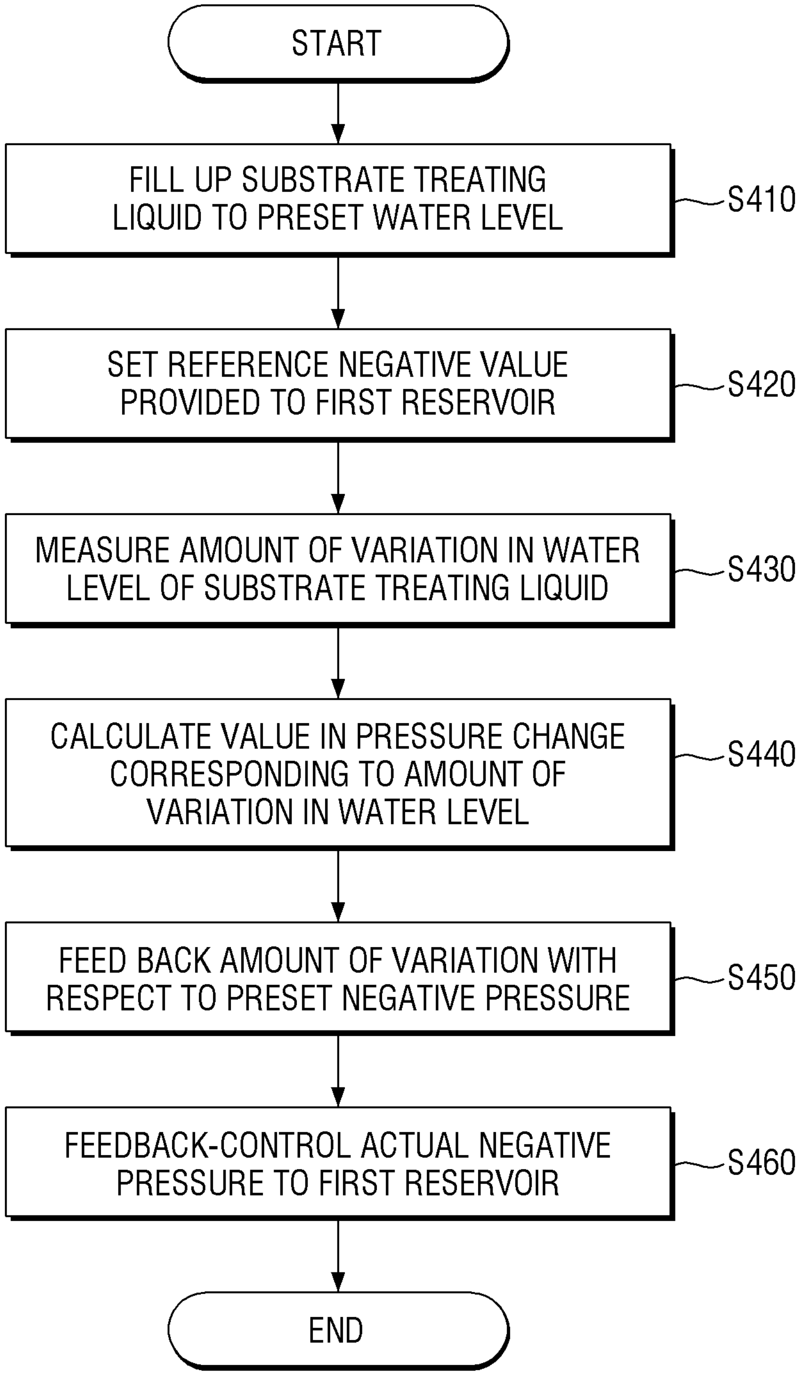

SUBSTRATE TREATING LIQUID SUPPLY UNIT AND SUBSTRATE TREATING APPARATUS INCLUDING THE SAME

CROSS-REFERENCE TO RELATED APPLICATION

This application claims priority from Korean Patent Application No. 10-2021-0099084 filed on Jul. 28, 2021, in the Korean Intellectual Property Office, and all the benefits accruing therefrom under 35 U.S.C. 119, the contents of which in its entirety are herein incorporated by reference.

BACKGROUND

1. Technical Field

The present disclosure relates to a substrate treating liquid supply unit and a substrate treating apparatus including the same, and more particularly, to a substrate treating liquid supply unit that provides a substrate treating liquid to an inkjet head unit that jets the substrate treating liquid onto a substrate, and a substrate treating apparatus including the same.

2. Description of the Related Art

When a printing process (e.g., RGB patterning) is performed on a transparent substrate to manufacture a display device such as an LCD panel, a PDP panel, or an LED panel, printing equipment having an inkjet head unit may be used.

SUMMARY

The inkjet head unit may be used to jet a chemical onto a substrate. In this case, the chemical should maintain a good meniscus at an end portion of a nozzle of the inkjet head unit. However, when the chemical does not maintain the meniscus at the end portion of the nozzle, non-jetting or poor jetting of the chemical may occur.

Therefore, it is necessary to always keep a liquid level of the nozzle of the inkjet head unit constant. However, there are difficulties in responding to changes in the liquid level of the nozzle due to fluctuations in an internal water level of a reservoir, such as supplying the chemical or printing, which may adversely affect a jetting quality or lifespan of the inkjet head unit.

Aspects of the present disclosure provide a substrate treating liquid supply unit for constantly maintaining a liquid level of a nozzle of an inkjet head unit through real-time water level measurement, and a substrate treating apparatus including the same.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a substrate treating liquid supply unit including: a first reservoir connected to an inkjet head unit for jetting a substrate treating liquid onto a substrate and providing the substrate treating liquid to the inkjet head unit; a water level sensor measuring a water level of the substrate treating liquid stored in the first reservoir; and a pressure control module compensating for a pressure provided to the first reservoir based on an amount variation in the water level of the substrate treating liquid, wherein a liquid level of a nozzle of the inkjet head unit is constantly maintained.

The water level sensor may measure the water level of the substrate treating liquid in real time, and the pressure control module may compensate for the pressure provided to the first reservoir in real time to constantly maintain the liquid level of the nozzle of the inkjet head unit.

The water level sensor may continuously measure the water level of the substrate treating liquid.

The pressure control module may include a control board calculating the pressure provided to the first reservoir based on a reference value and a measurement value of the water level sensor, and a pressure providing unit compensating for the pressure provided to the first reservoir based on a calculated value.

The pressure control module may calculate the pressure provided to the first reservoir based on a reference value, a density of the substrate treating liquid, and the amount of variation in the water level of the substrate treating liquid.

The pressure control module may calculate an amount of variation in the pressure provided to the first reservoir by multiplying the density of the substrate treating liquid, an acceleration of gravity, and the amount of variation in the water level of the substrate treating liquid, and calculate the pressure provided to the first reservoir by adding the amount of variation in the pressure to the reference value.

The reference value may be a preset value and may be a pressure value for a space not filled up with the substrate treating liquid in an internal space of the first reservoir.

The pressure control module may be connected to the first reservoir through a pneumatic line.

The pressure control module may compensate for a negative pressure with the pressure provided to the first reservoir.

The substrate treating liquid supply unit may further include a second reservoir connected to the first reservoir and supplementing the substrate treating liquid to the first reservoir.

The pressure control module may compensate for the pressure provided to the first reservoir by supplementing the first reservoir with a flow rate corresponding to the amount of variation in the water level of the substrate treating liquid.

The water level sensor may start to measure the water level of the substrate treating liquid after filling up the first reservoir with the substrate treating liquid to a predetermined water level, and setting a pressure value for a space not filled up with the substrate treating liquid in an internal space of the first reservoir.

The water level sensor may measure the water level of the substrate treating liquid when the substrate treating liquid is supplied from the first reservoir to the inkjet head unit or the substrate treating liquid is supplemented to the first reservoir.

The pressure control module may perform control so that a nozzle surface of the inkjet head unit does not get wet when the water level of the substrate treating liquid decreases, and perform control so that the nozzle surface does not dry when the water level of the substrate treating liquid increases.

According to another aspect of the present disclosure, there is provided a substrate treating liquid supply unit including: first reservoir connected to an inkjet head unit for jetting a substrate treating liquid onto a substrate and providing the substrate treating liquid to the inkjet head unit; a water level sensor measuring a water level of the substrate treating liquid stored in the first reservoir in real time; and a pressure control module calculating a pressure provided to the first reservoir based on a reference value, a density of the substrate treating liquid, an acceleration of gravity, and an amount of variation in the water level of the substrate treating liquid, and compensating for the pressure provided to the first reservoir in real time based on a calculated value, wherein a liquid level of a nozzle of the inkjet head unit is constantly maintained.

According to still another aspect of the present disclosure, there is provided a substrate treating apparatus including: an inkjet head unit jetting a substrate treating liquid onto a substrate; and a substrate treating liquid supply unit supplying the substrate treating liquid to the inkjet head unit, wherein the substrate treating liquid supply unit includes: a first reservoir connected to the inkjet head unit and providing the substrate treating liquid to the inkjet head unit, a water level sensor measuring a water level of the substrate treating liquid stored in the first reservoir, and a pressure control module compensating for a pressure provided to the first reservoir based on an amount variation in the water level of the substrate treating liquid, and a liquid level of a nozzle of the inkjet head unit is constantly maintained.

The substrate treating liquid may be quantum dot (QD) ink, and the substrate treating apparatus may be a printing equipment.

The substrate treating apparatus may further include a maintenance unit measuring a jetting position of the substrate treating liquid on the substrate and whether or not the substrate treating liquid is jetted.

The details of other exemplary embodiments are included in the detailed description and drawings.

BRIEF DESCRIPTION OF THE DRAWINGS

The above and other aspects and features of the present disclosure will become more apparent by describing in detail exemplary embodiments thereof with reference to the attached drawings, in which:

FIG. 1 is a diagram schematically illustrating an internal structure of a substrate treating apparatus according to an exemplary embodiment of the present disclosure;

FIG. 2 is a first exemplary diagram schematically illustrating an internal configuration of a substrate treating liquid supply unit constituting the substrate treating apparatus according to an exemplary embodiment of the present disclosure;

FIG. 3 is a second exemplary diagram schematically illustrating an internal configuration of the substrate treating liquid supply unit constituting the substrate treating apparatus according to an exemplary embodiment of the present disclosure;

FIG. 4 is a diagram schematically illustrating an outer shape of the substrate treating liquid supply unit constituting the substrate treating apparatus according to an exemplary embodiment of the present disclosure; and FIG. 5 is a flowchart for describing a method of constantly maintaining a liquid level of a nozzle of an inkjet head unit constituting a substrate treating apparatus according to an exemplary embodiment of the present disclosure.

DETAILED DESCRIPTION OF THE EMBODIMENTS

Hereinafter, exemplary embodiments of the present disclosure will be described in detail with reference to the accompanying drawings. The same reference numerals are used for the same components in the drawings, and duplicate descriptions thereof are omitted.

The present disclosure relates to a substrate treating liquid supply unit for constantly maintaining a liquid level of a nozzle of an inkjet head unit through real-time water level measurement, and a substrate treating apparatus including the same. Hereinafter, the present disclosure will be described in detail with reference to drawings and the like.

FIG. 1 is a diagram schematically illustrating an internal structure of a substrate treating apparatus according to an exemplary embodiment of the present disclosure.

Referring to FIG. 1, a substrate treating apparatus 100 may be configured to include a process treating unit 110, a maintenance unit 120, a gantry unit 130, an inkjet head unit 140, a substrate treating liquid supply unit 150, and a controller 160.

The substrate treating apparatus 100 treats a substrate G (e.g., a glass substrate) used for manufacturing a display device. The substrate treating apparatus 100 may be implemented as a printing facility for jetting a substrate treating liquid onto the substrate G using the inkjet head unit 140, and may be implemented as a circulation system inkjet facility in order to prevent a nozzle from being clogged by the substrate treating liquid.

A process treating unit 110 supports the substrate G while a PT operation is performed on the substrate G. The process treating unit 110 may support the substrate G using a non-contact method. The process treating unit 110 may support the substrate G by levitating the substrate Gin the air using, for example, air. However, the present exemplary embodiment is not limited thereto. The process treating unit 110 may also support the substrate G using a contact method. The process treating unit 110 may support the substrate G using, for example, a support member having a seating surface provided thereon.

Meanwhile, the PT operation described above refers to performing a printing treatment on the substrate G using a substrate treating liquid, and the substrate treating liquid refers to a chemical used to perform the printing treatment on the substrate G. The substrate treating liquid may be, for example, quantum dot (QD) ink including ultra-fine semiconductor particles.

When the substrate G is supported by using air, the process treating unit 110 may include a first stage 111 and an air hole 112.

The first stage 111 serves as a base, and is provided so that the substrate G may be seated thereon. The air hole 112 may be formed to penetrate through an upper surface of the first stage 111, and a plurality of air holes 112 may be formed in a PT zone on the first stage 111.

The air holes 112 may inject air in an upper direction (a third direction 30) of the first stage 111. As a result, the air holes 112 may levitate the substrate G seated on the first stage 111 in the air.

Meanwhile, although not illustrated in FIG. 1, the process treating unit 110 may further include a gripper. The gripper is for preventing the substrate G from being separated from the first stage 111 when the substrate G moves in a length direction (a first direction 10) of the first stage 111. The gripper may grip the substrate G to prevent the substrate G from being separated from the first stage 111, and may slide along a guide rail (not illustrated) while gripping the substrate G when the substrate G moves.

The maintenance unit 120 measures a jetting position (i.e., a spot) of the substrate treating liquid on the substrate G, whether or not the substrate treating liquid is jetted, and the like. The maintenance unit 120 may measure the jetting position of the substrate treating liquid, whether or not the substrate treating liquid is jetted, and the like for each of the plurality of nozzles provided in the inkjet head unit 140, and may allow a measurement result obtained as described above to be provided to the controller 160.

The maintenance unit 120 may include, for example, a second stage 121, a third guide rail 122, a first plate 123, a calibration board 124, and a vision module 125.

The second stage 121 serves as a base like the first stage 111, and may be disposed in parallel to the first stage 111. The second stage 121 may be provided to have the same size as that of the first stage 111, but may also be provided to have a size smaller or larger than that of the first stage 111. The second stage 121 may include an MT zone thereon.

The third guide rail 122 guides a movement path of the first plate 123. The third guide rail 122 may be provided as at least one line on the second stage 121 in the length direction (the first direction 10) of the second stage 121. The third guide rail 122 may be implemented as, for example, a linear motor (LM) guide system.

Meanwhile, although not illustrated in FIG. 1, the maintenance unit 120 may further include a fourth guide rail. The fourth guide rail guides the movement path of the first plate 123 like the third guide rail 122, and may be provided as at least one line on the second stage 121 along a width direction (a second direction 20) of the second stage 121. The fourth guide rail may also be implemented as an LM guide system like the third guide rail 122.

The first plate 123 moves on the second stage 121 along the third guide rail 122 and/or the fourth guide rail. The first plate 123 may move in parallel with the substrate G along the third guide rail 122, and may approach or move away from the substrate G along the fourth guide rail.

The calibration board 124 is for measuring the jetting position of the substrate treating liquid on the substrate G. The calibration board 124 may be installed on the first plate 123, including an alignment mark, a ruler, and the like, and may be provided along the length direction (the first direction 10) of the first plate 123.

The vision module 125 acquires image information on the substrate G in order to measure the jetting position of the substrate treating liquid, whether or not the substrate treating liquid is jetted, and the like. The vision module 125 may include an area scan camera, a line scan camera, and the like, and may acquire image information on the substrate Gin real time. Meanwhile, the vision module 125 may acquire and provide information on the calibration board 124 as well as the information on the substrate G on which the substrate treating is jetted.

The vision module 125 may be provided on a side portion or a lower portion of the gantry unit 130 to photograph the substrate G or the like. The vision module 125 may be installed, for example, to be attached to a side surface of the inkjet head unit 140. However, the present exemplary embodiment is not limited thereto. The vision module 125 may also be provided on the first plate 123. Meanwhile, a plurality of vision modules 125 may also be provided in the substrate treating apparatus 100, and may be fixedly installed or movably installed.

The gantry unit 130 supports the inkjet head unit 140. The gantry unit 130 may be provided on the first stage 111 and the second stage 121 so that the inkjet head unit 140 may jet the substrate treating liquid onto the substrate G.

The gantry unit 130 may be provided on the first stage 111 and the second stage 121 with the width direction (the second direction 20) of the first stage 111 and the second stage 121 as a length direction thereof. The gantry unit 130 may move in the length direction (the first direction 10) of the first stage 111 and the second stage 121 along a first guide rail **170*a* and a second guide rail 170*b*. Meanwhile, the first guide rail 170*a* and the second guide rail 170*b* may be provided outside the first stage 111 and the second stage 121 along the length direction (the first direction 10) of the first stage 111 and the second stage 121**.

Meanwhile, although not illustrated in FIG. 1, the substrate treating apparatus 100 may further include a gantry moving unit. The gantry moving unit moves the gantry unit 130 along the first guide rail **170*a* and the second guide rail 170*b*. The gantry moving unit may be installed inside the gantry unit 130 and may include a first moving module (not illustrated) and a second moving module (not illustrated). The first moving module and the second moving module may be provided at both end portions within the gantry unit 130, and may move the gantry unit 130 to slide along the first guide rail 170*a* and the second guide rail 170*b***.

The inkjet head unit 140 jets the substrate treating liquid onto the substrate G in the form of droplets. The inkjet head unit 140 may be provided on a side portion or a lower portion of the gantry unit 130.

At least one inkjet head unit 140 may be installed in the gantry unit 130. When a plurality of inkjet head units 140 are installed in the gantry unit 130, the plurality of inkjet head units 140 may be disposed in a line along the length direction (the second direction 20) of the gantry unit 130.

The inkjet head unit 140 may move along the length direction (the second direction 20) of the gantry unit 130 to be positioned at a desired point on the substrate G. However, the present exemplary embodiment is not limited thereto. The inkjet head unit 140 may move along a height direction (the third direction 30) of the gantry unit 130, and may also rotate clockwise or counterclockwise.

Meanwhile, the inkjet head unit 140 may also be installed to be fixed to the gantry unit 130 In this case, the gantry unit 130 may be provided to be movable.

Meanwhile, although not illustrated in FIG. 1, the substrate treating apparatus 100 may further include an inkjet head moving unit. The inkjet head moving unit linearly moves or rotates the inkjet head unit 140. When the substrate treating apparatus 100 includes the plurality of inkjet head units 140, the number of inkjet head moving units corresponding to the number of inkjet head units 140 may be provided in the substrate treating apparatus 100 in order to independently operate the plurality of inkjet head units 140. Meanwhile, it is also possible that a single inkjet head moving unit is provided in the substrate treating apparatus 100 in order to integrally operate the plurality of inkjet head units 140.

Meanwhile, although not illustrated in FIG. 1, the inkjet head unit 140 may include a nozzle plate, a plurality of nozzles, a piezoelectric element, and the like. The nozzle plate constitutes a body of the inkjet head unit 140. A plurality of (e.g., 128, 256, etc.) nozzles may be provided in multiple rows and columns at regular intervals on a lower portion of such a nozzle plate, and the number of piezoelectric elements corresponding to the number of nozzles may be provided in the nozzle plate. When the inkjet head unit 140 is configured as described above, the substrate treating liquid may be jetted onto the substrate G through the nozzles according to the operation of the piezoelectric elements.

Meanwhile, the inkjet head unit 140 may also independently adjust a jetting amount of the substrate treating liquid provided through each nozzle according to a voltage applied to the piezoelectric element.

The substrate treating liquid supply unit 150 supplies ink to the inkjet head unit 140. The substrate treating liquid supply unit 150 may include a first reservoir 210 and a pressure control module 220.

The first reservoir 210 stores the substrate treating liquid, and the pressure control module 220 adjusts an internal pressure of the first reservoir 210. The first reservoir 210 may supply an appropriate amount of the substrate treating liquid to the inkjet head unit 140 based on a pressure provided by the pressure control module 220.

The controller 160 performs maintenance on the inkjet head unit 140. The controller 160 may correct a jetting position of the substrate treating liquid of each nozzle provided in the inkjet head unit 140 based on a measurement result of the maintenance unit 120, or detect defective nozzles (i.e., nozzles that do not jet the substrate treating liquid) among the plurality of nozzles and perform a cleaning operation on the defective nozzles. To this end, the controller 160 may control the operation of each component constituting the substrate treating apparatus 100.

The controller 160 may be provided as a computer or a server, including a process controller, a control program, an input module, an output module (or a display module), a memory module, and the like. In the above, the process controller may include a microprocessor that executes a control function for each component constituting the substrate treating apparatus 100, and the control program may execute a variety of treatments of the substrate treating apparatus 100 under the control of the process controller. The memory module stores a program for executing a variety of treatments of the substrate treating apparatus 100 according to a variety of data and treatment conditions, that is, a treatment recipe.

Meanwhile, although not illustrated in FIG. 1, the substrate treating apparatus 100 may further include a nozzle inspection unit. The nozzle inspection unit is for determining whether there is an abnormality with respect to each nozzle installed in the inkjet head unit 140. The nozzle inspection unit may determine whether there is an abnormality in the nozzle using, for example, an optical inspection.

The substrate treating liquid supply unit 150 may supply the substrate treating liquid stored in the first reservoir 210 to the inkjet head unit 140 based on the pressure provided by the pressure control module 220. In this case, when a positive pressure is provided by the pressure control module 220, a chemical may be supplied from the first reservoir 210 to the inkjet head unit 140, and when a negative pressure is provided by the pressure control module 220, the supply of the chemical from the first reservoir 210 to the inkjet head unit 140 may be stopped.

As described above, the substrate treating liquid supply unit 150 may constantly maintain a liquid level of the nozzle of the inkjet head unit 140 based on the pressure provided by the pressure control module 220.

However, in the case of large-area printing, since the consumption of the substrate treating liquid is large, an internal water level of the first reservoir 210 may gradually decrease in the same negative pressure environment, and accordingly, the liquid level of the nozzle of the inkjet head unit 140 may also vary. As such, it is difficult to respond to the change in the liquid level of the nozzle of the inkjet head unit 140 according to the change in the internal water level of the first reservoir 210, and as a result, a jetting quality of the inkjet head unit 140 may be deteriorated, and the lifespan of the inkjet head unit 140 may also be shortened.

In addition, when the substrate treating liquid is frequently supplied to the inkjet head unit 140 in order to maintain the internal water level of the first reservoir 210 within a certain range, tack time may also be affected due to the number of times the substrate treating liquid is repeatedly supplied.

In the present exemplary embodiment, in order to constantly the liquid level of the nozzle of the inkjet head unit 140, the internal water level of the first reservoir 210 may be measured in real time. Hereinafter, this will be described in detail.

FIG. 2 is a first exemplary diagram schematically illustrating an internal configuration of a substrate treating liquid supply unit constituting the substrate treating apparatus according to an exemplary embodiment of the present disclosure.

Referring to FIG. 2, the substrate treating liquid supply unit 150 may include a first reservoir 210, a pressure control module 220, and a water level sensor 230.

The first reservoir 210 supplies the substrate treating liquid to the inkjet head unit 140. The first reservoir 210 may be installed above the inkjet head unit 140 and may be connected to the inkjet head unit 140 through a pipe having a predetermined length.

The water level sensor 230 measures a water level of the substrate treating liquid stored in the first reservoir 210. The water level sensor 230 may measure the water level of the substrate treating liquid in real time.

The water level sensor 230 may be configured as a type capable of performing continuous measurement in order to measure the water level of the substrate treating liquid in real time. The water level sensor 230 does not have a measurement method limited to a specific method, but may be configured as the type capable of performing the continuous measurement in the present exemplary embodiment in order to compensate for the water level of the substrate treating liquid stored in the first reservoir 210 in real time. The water level sensor 230 may be implemented as, for example, a capacitive type continuous water level sensor.

The pressure control module 220 controls the pressure provided to the inside of the first reservoir 210 in which the substrate treating liquid is stored based on a measurement value of the water level sensor 230. To this end, the pressure control module 220 may include a pressure providing unit 221 and a control board 222.

The control board 222 calculates the pressure applied to the first reservoir 210. The control board 222 may calculate the pressure provided to the first reservoir 210 based on the measurement value of the water level sensor 230 and a reference value. The control board 222 may be implemented as a board type including a microprocessor with an arithmetic function, a memory with a storage function, and the like. When the pressure control module 220 is implemented as a pressure controller module (PCM), the control board 222 may be implemented as a board-type pressure controller (PCON).

The control board 222 may calculate the pressure provided to the first reservoir 210 using the following equation.

$$P = \text{Reference Value} + \text{Variation Value} = \text{Reference Value} + \rho g h$$

In the above, P denotes a pressure provided to the first reservoir 210, and Reference Value denotes a reference value. The reference value may be a preset pressure value of the pressure providing unit 221. In addition, Variation Value denotes an amount of variation in the pressure provided to the first reservoir 210, and ρ denotes a density of the substrate treating liquid stored in the first reservoir 210. In addition, g denotes acceleration of gravity, and h denotes an amount of variation in the water level of the substrate treating liquid stored in the first reservoir 210.

In the above, the water level of the substrate treating liquid stored inside the first reservoir 210 may be obtained by measuring position information of the liquid level inside the first reservoir 210 in real time using the water level sensor 230.

However, the present exemplary embodiment is not limited thereto. The water level of the substrate treating liquid may also be provided as a proportional value between a substrate treating liquid region and an air region inside the first reservoir 210.

Meanwhile, the control board 222 may receive the measurement value of the water level sensor 230 and the set value (i.e., the reference value) of the pressure providing unit 221 in real time, and may feed back a pressure compensation value (i.e., the pressure calculated by the above equation) corresponding thereto to the pressure providing unit 221.

The pressure providing unit 221 provides pressure to the inside of the first reservoir 210 based on the pressure compensation value calculated by the control board 222. The pressure providing unit 221 may provide a negative pressure to the inside of the first reservoir 210 when the liquid level of the nozzle of the inkjet head unit 140 is constantly maintained.

The pressure providing unit 221 may provide a predetermined amount of pressure to the inside of the first reservoir 210 using air. To this end, the pressure providing unit 221 and the first reservoir 210 may be connected to each other through a pneumatic line 240 for managing a pressure of an air layer.

Meanwhile, the substrate treating liquid supply unit 150 may further include a second reservoir 260 in addition to the first reservoir 210.

FIG. 3 is a second exemplary diagram schematically illustrating an internal configuration of the substrate treating liquid supply unit constituting the substrate treating apparatus according to an exemplary embodiment of the present disclosure.

Referring to FIG. 3, the substrate treating liquid supply unit 150 may include the first reservoir 210, the pressure control module 220, the water level sensor 230, and a second reservoir 260.

Since the first reservoir 210, the pressure control module 220, and the water level sensor 230 have been described above with reference to FIG. 2, a detailed description thereof will be omitted herein.

The second reservoir 260 receives and stores the substrate treating liquid from an external source (not illustrated). The second reservoir 260 may be disposed above the first reservoir 210, and may serve to supplement the substrate treating liquid stored in the first reservoir 210.

When the substrate treating liquid supply unit 150 includes the first reservoir 210 and the second reservoir 260, the first reservoir 210 may be implemented as a supply reservoir module (SRM), and the second reservoir 260 may be implemented as a buffer reservoir module (BRM).

On the other hand, when the substrate treating liquid supply unit 150 includes only the first reservoir 210, the first reservoir 210 may be implemented in a form in which a supply reservoir module SRM and a buffer reservoir module BRM are combined. That is, the first reservoir 210 may receive and store the substrate treating liquid from an external supply source, and may provide the substrate treating liquid to the inkjet head unit 140 during a printing operation.

Meanwhile, the control board 222 may also control the second reservoir 260 or the external supply source so that a flow rate corresponding to the pressure compensation value is supplied to the first reservoir 210. For example, when the pressure providing unit 221 does not operate normally due to a failure (e.g., when the pressure providing unit 221 fails to provide the negative pressure to the first reservoir 210), the control board 222 may control the second reservoir 260 or the external supply source so that a flow rate corresponding to the pressure compensation value is supplied to the first reservoir 210.

Meanwhile, when the substrate treating liquid supply unit 150 includes the first reservoir 210 and the water level sensor 230, the substrate treating liquid supply unit 150 may be implemented in the form illustrated in FIG. 4. FIG. 4 is a diagram schematically illustrating an outer shape of the substrate treating liquid supply unit constituting the substrate treating apparatus according to an exemplary embodiment of the present disclosure. The following description refers to FIG. 4.

The water level sensor 230 may be installed on an outer side surface of the first reservoir 210. The water level sensor 230 may be installed on the outer side surface of the first reservoir 210 with a height direction (a third direction 30) of the first reservoir 210 as a length direction thereof.

When the water level sensor 230 is installed on the side surface of the first reservoir 210 in this way, the water level sensor 230 may detect the variation in the water level of the substrate treating liquid in real time, and the pressure control module 220 may compensate for a pressure (negative pressure) corresponding to the amount of variation in the water level of the substrate treating liquid in real time. Accordingly, in the present exemplary embodiment, it is possible to solve various problems that may occur in the situation of increasing and decreasing the water level.

A pneumatic unit 310 connected to the pneumatic line 240 may be installed on an upper portion of the first reservoir 210, and an ink supply unit 320 connected to a treating liquid supply line 250 together with the pneumatic unit 310 may be installed. The treating liquid supply line 250 may connect the first reservoir 210 and the second reservoir 260 to each other when the substrate treating liquid supply unit 150 includes the second reservoir 260 together with the first reservoir 210, and may connect the first reservoir 210 and the external supply source to each other when the substrate treating liquid supply unit 150 includes only the first reservoir 210.

Meanwhile, a pipe 330 connecting the first reservoir 210 and the inkjet head unit 140 to each other may be installed on a lower portion of the first reservoir 210.

The substrate treating liquid supply unit 150 that measures the water level of the substrate treating liquid in real time and provides the pressure corresponding thereto has been described above with reference to FIGS. 2 to 4. Hereinafter, a method of constantly maintaining the liquid level of the nozzle of the inkjet head unit 140 by measuring the water level of the substrate treating liquid in real time will be described.

FIG. 5 is a flowchart for describing a method of constantly maintaining a liquid level of a nozzle of an inkjet head unit constituting a substrate treating apparatus according to an exemplary embodiment of the present disclosure. The following description refers to FIG. 5.

First, the second reservoir 260 fills up the substrate treating liquid in the first reservoir 210 to a preset water level (S410). In this case, the external supply source may also fill up the substrate treating liquid in the first reservoir 210 to the preset water level.

Thereafter, the control board 222 and the pressure providing unit 221 set the remaining space (i.e., the air layer) in an internal space (i.e., a storage space in which the substrate treating liquid is stored) of the first reservoir 210 except for a space (i.e., a chemical space) in which the substrate treating liquid is filled up to a preset negative pressure value (S420).

Thereafter, the water level sensor 230 measures the amount of variation in the water level of the substrate treating liquid in the first reservoir 210 (S430). The water level sensor 230 may measure the amount of variation in the water level of the substrate treating liquid in real time, and may also measure the amount of variation in the water level of the substrate treating liquid when the substrate treating liquid is supplied from the first reservoir 210 to the inkjet head unit 140 and the substrate treating liquid stored in the first reservoir 210 is consumed, or when the substrate treating liquid is supplied from the second reservoir 260 or the external supply source to the first reservoir 210 and the substrate treating liquid is filled up in the first reservoir 210.

Thereafter, the control board 222 compares the amount of variation in the water level measured by the water level sensor 230 with a preset water level value, and calculates a difference in pressure change corresponding to a difference value (i.e., a difference between the amount of variation in the water level and the preset water level value) using the above-described equation (S440).

Thereafter, the control board 222 feeds back an amount of variation with respect to a preset negative pressure to the pressure providing unit 221 based on an arithmetic value (S450).

Thereafter, the pressure providing unit 221 checks the amount of variation in the negative pressure fed back from the control board 222 and feedback-controls an actual negative pressure to the first reservoir 210 (S460). The feedback control of the pressure providing unit 221 may be continuously provided along with the real-time measurement of the water level sensor 230.

On the other hand, after the feedback control (S460) of the pressure providing unit 221, when a water level region of the substrate treating liquid in the first reservoir 210 is higher than a preset water level region, the substrate treating liquid may be drained to the outside, and when the water level region of the substrate treating liquid in the first reservoir 210 is lower than the preset water level region, the substrate treating liquid may be supplemented to the first reservoir 210.

The substrate treating liquid supply unit 150 and the substrate treating apparatus 100 including the same according to the exemplary embodiment of the present disclosure have been described above with reference to FIGS. 1 to 5.

The present disclosure relates to the apparatus and method for constantly maintaining the liquid level of the nozzle of the inkjet head unit 140 through real-time water level measurement of the water level sensor 230. Specifically, according to the present disclosure, the liquid level of the nozzle of the inkjet head unit 140 may be constantly maintained by detecting the variation in the water level in a chemical supply device (i.e., the first reservoir 210) in real time, and compensating for the negative pressure corresponding to the amount of variation in the water level in real time.

According to the present disclosure, a water level measurement apparatus including a reservoir capable of supplying a chemical (i.e., the first reservoir 210), the water level sensor 230 for measuring the liquid level in a storage space of the reservoir, a pressure controller (i.e., the pressure providing unit 221) for adjusting the pressure, and the control board 222 may be provided.

In addition, according to the present disclosure, the liquid level of the nozzle of the inkjet head unit 140 may be constantly maintained by receiving the measured water level information from the water level sensor 230 for the negative pressure and water level at which the reference value is set, comparing the actual water level value with a preset water level value, and feedback-controlling the difference between the preset negative pressure value and the actual negative pressure value.

According to the present disclosure, a wetting/drying phenomenon of a nozzle surface may be prevented by compensating for the negative pressure corresponding to the variation in the water level of the substrate treating liquid. That is, it is possible to maintain the jetting quality of the inkjet head unit 140 by preventing the wetting phenomenon of the nozzle surface in a situation where the water level decreases, and it is possible to increase the lifespan of the inkjet head unit 140 by preventing the drying phenomenon of the nozzle surface in a situation where the water level increases.

The exemplary embodiments of the present disclosure have been described above with reference to the accompanying drawings, but the present disclosure may be implemented in various different forms, and those skilled in the art to which the present disclosure pertains may understand that the present disclosure may be implemented in other specific forms without changing the technical spirit or essential features of the present disclosure. Therefore, it should be understood that the exemplary embodiments described above are illustrative in all aspects and not restrictive.

What is claimed is:

1. A substrate treating liquid supply unit comprising:

a first reservoir connected to an inkjet head unit for jetting a substrate treating liquid onto a substrate and configured to provide the substrate treating liquid to the inkjet head unit;

a water level sensor configured to measure a water level of the substrate treating liquid stored in the first reservoir;

a pressure control module configured to compensate for a pressure provided to the first reservoir based on an amount variation in the water level of the substrate treating liquid stored in the first reservoir; and a second reservoir connected to the first reservoir and supplementing the substrate treating liquid to the first reservoir, wherein the pressure control module includes:

a control board calculating the pressure provided to the first reservoir based on a reference value and a measurement value of the water level sensor, and a pressure providing unit compensating for the pressure provided to the first reservoir based on a calculated value, wherein the water level sensor is installed on an outer side surface of the first reservoir with a height direction of the first reservoir as a length direction thereof to measure the water level of the substrate treating liquid stored in the first reservoir, and wherein the control board is configured to, when the pressure providing unit does not operate normally, control the second reservoir such that a flow rate corresponding to a pressure compensation value is supplied to the first reservoir.

2. The substrate treating liquid supply unit of claim 1, wherein the water level sensor measures the water level of the substrate treating liquid in real time, and the pressure control module compensates for the pressure provided to the first reservoir in real time to constantly maintain the liquid level of the nozzle of the inkjet head unit.

3. The substrate treating liquid supply unit of claim 1, wherein the water level sensor continuously measures the water level of the substrate treating liquid.

4. The substrate treating liquid supply unit of claim 1, wherein the pressure control module calculates the pressure provided to the first reservoir based on a reference value, a density of the substrate treating liquid, and the amount of variation in the water level of the substrate treating liquid.

5. The substrate treating liquid supply unit of claim 4, wherein the pressure control module calculates an amount of variation in the pressure provided to the first reservoir by multiplying the density of the substrate treating liquid, an acceleration of gravity, and the amount of variation in the water level of the substrate treating liquid, and calculates the pressure provided to the first reservoir by adding the amount of variation in the pressure to the reference value.

6. The substrate treating liquid supply unit of claim 4, wherein the reference value is a preset value and is a pressure value for a space not filled up with the substrate treating liquid in an internal space of the first reservoir.

7. The substrate treating liquid supply unit of claim 1, wherein the pressure control module is connected to the first reservoir through a pneumatic line.

8. The substrate treating liquid supply unit of claim 1, wherein the pressure control module compensates for a negative pressure with the pressure provided to the first reservoir.

9. The substrate treating liquid supply unit of claim 1, wherein the pressure control module compensates for the pressure provided to the first reservoir by supplementing the first reservoir with a flow rate corresponding to the amount of variation in the water level of the substrate treating liquid.

10. The substrate treating liquid supply unit of claim 1, wherein the water level sensor starts to measure the water level of the substrate treating liquid after filling up the first reservoir with the substrate treating liquid to a predetermined water level, and setting a pressure value for a space not filled up with the substrate treating liquid in an internal space of the first reservoir.

11. The substrate treating liquid supply unit of claim 1, wherein the water level sensor measures the water level of the substrate treating liquid when the substrate treating liquid is supplied from the first reservoir to the inkjet head unit or the substrate treating liquid is supplemented to the first reservoir.

12. The substrate treating liquid supply unit of claim 1, wherein the pressure control module performs control so that a nozzle surface of the inkjet head unit does not get wet when the water level of the substrate treating liquid decreases, and performs control so that the nozzle surface does not dry when the water level of the substrate treating liquid increases.

13. A substrate treating liquid supply unit comprising:

a first reservoir connected to an inkjet head unit for jetting a substrate treating liquid onto a substrate and configured to provide the substrate treating liquid to the inkjet head unit;

a water level sensor configured to measure a water level of the substrate treating liquid stored in the first reservoir in real time;

a pressure control module configured to calculate a pressure provided to the first reservoir based on a reference value, a density of the substrate treating liquid, an acceleration of gravity, and an amount of variation in the water level of the substrate treating liquid stored in the first reservoir, and compensate for the pressure provided to the first reservoir in real time based on a calculated value; and a second reservoir connected to the first reservoir and supplementing the substrate treating liquid to the first reservoir, wherein the pressure control module includes:

a control board calculating the pressure provided to the first reservoir based on a reference value and a measurement value of the water level sensor, and a pressure providing unit compensating for the pressure provided to the first reservoir based on a calculated value, wherein the water level sensor is installed on an outer side surface of the first reservoir with a height direction of the first reservoir as a length direction thereof to measure the water level of the substrate treating liquid stored in the first reservoir, and wherein the control board is configured to, when the pressure providing unit does not operate normally, control the second reservoir such that a flow rate corresponding to a pressure compensation value is supplied to the first reservoir.

14. A substrate treating apparatus comprising:

an inkjet head unit jetting a substrate treating liquid onto a substrate; and a substrate treating liquid supply unit configured to supply the substrate treating liquid to the inkjet head unit, wherein the substrate treating liquid supply unit includes:

a first reservoir connected to the inkjet head unit and configured to provide the substrate treating liquid to the inkjet head unit, a water level sensor configured to measure a water level of the substrate treating liquid stored in the first reservoir, a pressure control module configured to compensate for a pressure provided to the first reservoir based on an amount variation in the water level of the substrate treating liquid stored in the first reservoir, and a second reservoir connected to the first reservoir and supplementing the substrate treating liquid to the first reservoir, wherein the pressure control module includes:

a control board calculating the pressure provided to the first reservoir based on a reference value and a measurement value of the water level sensor, and a pressure providing unit compensating for the pressure provided to the first reservoir based on a calculated value, wherein the water level sensor is installed on an outer side surface of the first reservoir with a height direction of the first reservoir as a length direction thereof to measure the water level of the substrate treating liquid stored in the first reservoir, and wherein the control board is configured to, when the pressure providing unit does not operate normally, control the second reservoir such that a flow rate corresponding to a pressure compensation value is supplied to the first reservoir.

15. The substrate treating apparatus of claim 14, wherein the substrate treating liquid is quantum dot (QD) ink, and the substrate treating apparatus is a printing equipment.

16. The substrate treating apparatus of claim 14, further comprising a maintenance unit measuring a jetting position of the substrate treating liquid on the substrate and whether or not the substrate treating liquid is jetted.

17. The substrate treating apparatus of claim 14, wherein the water level sensor measures the water level of the substrate treating liquid in real time, and the pressure control module compensates for the pressure provided to the first reservoir in real time to constantly maintain the liquid level of the nozzle of the inkjet head unit.

18. The substrate treating apparatus of claim 14, wherein the pressure control module calculates the pressure provided to the first reservoir based on a reference value, an acceleration of gravity, a density of the substrate treating liquid, and the amount of variation in the water level of the substrate treating liquid.

* * * * *